United States Patent
Gaizman et al.

(10) Patent No.: US 12,052,497 B2
(45) Date of Patent: Jul. 30, 2024

(54) COMBINED ELECTRONIC IMAGE STABILIZATION AND OPTICAL IMAGE STABILIZATION

(71) Applicant: QUALCOMM Incorporated, San Diego, CA (US)

(72) Inventors: Ron Gaizman, Haifa (IL); Eliad Tsairi, Hof HaCarmel (IL); Meir Tzur, Haifa (IL); Maksym Aslianskyi, Tel Aviv (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/847,488

(22) Filed: Apr. 13, 2020

(65) Prior Publication Data

US 2020/0412954 A1 Dec. 31, 2020

Related U.S. Application Data

(60) Provisional application No. 62/866,597, filed on Jun. 25, 2019.

(51) Int. Cl.
  *H04N 23/68* (2023.01)
(52) U.S. Cl.
  CPC ..... *H04N 23/6811* (2023.01); *H04N 23/6812* (2023.01)
(58) Field of Classification Search
  CPC ........... H04N 5/23254; H04N 5/23258; H04N 5/23287; H04N 5/2329; H04N 5/2257;
  (Continued)

(56) References Cited

U.S. PATENT DOCUMENTS 6,055,378 A * 4/2000 Oono ................. G02B 7/08
                                                     396/133
8,493,454 B1   7/2013 Kohn et al.
(Continued)

FOREIGN PATENT DOCUMENTS

CN    101345824 A    1/2009
CN    106662793 A    5/2017
(Continued)

OTHER PUBLICATIONS

International Search Report and Written Opinion—PCT/US2020/032630—ISA/EPO—dated Jul. 13, 2020.

*Primary Examiner* — Jason A Flohre
(74) *Attorney, Agent, or Firm* — QUALCOMM Incorporated

(57) ABSTRACT

Example are described for combining optical image stabilization and electronic image stabilization for capture and processing of frames for video. An example device configured to perform electronic image stabilization in light of optical image stabilization performed may include a memory and one or more processors. The one or more processors may be configured to obtain optical image stabilization (OIS) information for OIS performed during capture of a sequence of frames by an image sensor and determine an electronic image stabilization (EIS) filter based on the OIS information. The one or more processors may also be configured to obtain camera position information, and the EIS filter may also be based on the camera position information. The one or more processors may also configure an image signal processor to perform EIS based on the EIS filter.

27 Claims, 9 Drawing Sheets

(58) Field of Classification Search
CPC .......... H04N 23/6811; H04N 23/6812; H04N 23/687; H04N 23/689; H04N 23/57
See application file for complete search history.

(56) References Cited

U.S. PATENT DOCUMENTS

| | | | |
|---|---|---|---|
| 9,743,001 B1* | 8/2017 | Stec | H04N 5/2329 |
| 2004/0150726 A1* | 8/2004 | Gallagher | H04N 1/00244 |
| | | | 348/222.1 |
| 2005/0259156 A1 | 11/2005 | Kosaka et al. | |
| 2006/0033818 A1* | 2/2006 | Wada | H04N 5/23248 |
| | | | 348/208.11 |
| 2009/0091832 A1* | 4/2009 | Nagai | H04N 5/232 |
| | | | 359/557 |
| 2011/0279692 A1* | 11/2011 | Hirayama | H04N 23/6812 |
| | | | 348/208.5 |
| 2012/0113280 A1* | 5/2012 | Stupak | H04N 5/2328 |
| | | | 348/208.99 |
| 2012/0113515 A1* | 5/2012 | Karn | H04N 5/23248 |
| | | | 359/557 |
| 2012/0262587 A1* | 10/2012 | Schmid | H04N 5/23248 |
| | | | 348/208.4 |
| 2013/0208134 A1* | 8/2013 | Hamalainen | H04N 5/23258 |
| | | | 348/208.99 |
| 2014/0267807 A1* | 9/2014 | Miyahara | H04N 5/23287 |
| | | | 348/208.4 |
| 2015/0085149 A1* | 3/2015 | Tsubaki | H04N 5/2628 |
| | | | 348/208.4 |
| 2015/0350550 A1* | 12/2015 | Thivent | H04N 5/23287 |
| | | | 348/208.11 |
| 2016/0057353 A1* | 2/2016 | Tuulos | H04N 23/687 |
| | | | 348/208.99 |
| 2016/0360111 A1* | 12/2016 | Thivent | H04N 5/23287 |
| 2017/0332018 A1* | 11/2017 | Bell | H04N 5/23267 |
| 2017/0353662 A1* | 12/2017 | Enta | H04N 5/23261 |
| 2019/0102868 A1 | 4/2019 | Beric et al. | |
| 2019/0104255 A1* | 4/2019 | Shi | H04N 5/23254 |
| 2019/0166314 A1* | 5/2019 | Cohen | H04N 5/2628 |
| 2019/0191090 A1 | 6/2019 | Murashima et al. | |
| 2022/0174216 A1* | 6/2022 | Ozone | H04N 5/23258 |

FOREIGN PATENT DOCUMENTS

| | | |
|---|---|---|
| CN | 108702450 A | 10/2018 |
| CN | 109618090 A | 4/2019 |
| WO | 2016190994 A1 | 12/2016 |

* cited by examiner

COMBINED ELECTRONIC IMAGE STABILIZATION AND OPTICAL IMAGE STABILIZATION

RELATED APPLICATION

This patent application claims priority to U.S. provisional patent application No. 62/866,597 entitled "COMBINED ELECTRONIC AND OPTICAL IMAGE STABILIZATION" and filed on Jun. 25, 2019, which is assigned to the assignee hereof. The disclosure of the prior application is considered part of and is incorporated by reference in this patent application.

TECHNICAL FIELD

This disclosure relates generally to image capture systems and devices, including combined electronic image stabilization and optical image stabilization.

BACKGROUND

Many devices and systems include one or more cameras to capture images or video of a scene. Global motion caused by, e.g., a user's hand causing device jitter, translational or rotational movement of the device, etc., may cause blurring in an image or video. Blurring of objects in the scene (or of the entire scene) are undesired by the user.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

Examples are described for combining optical image stabilization for capture of a sequence of frames and electronic image stabilization for post-capture processing of the sequence of frames for video. An example device configured to perform electronic image stabilization in light of optical image stabilization may include a memory and one or more processors. The one or more processors may be configured to obtain optical image stabilization (OIS) information for OIS performed during capture of a sequence of frames by an image sensor and determine an electronic image stabilization (EIS) filter based on the OIS information. The one or more processors may also be configured to obtain camera position information, and the EIS filter may also be based on the camera position information. The one or more processors may also configure an image signal processor to perform EIS based on the EIS filter.

In some implementations, the position of the movable camera lens is with reference to the image sensor. The one or more processors may be configured to determine a lens distortion correction (LDC) transform based on the positions of the moveable camera lens during capture of the sequence of frames, and the EIS filter is based on the LDC transform. In this manner, the device may be able to perform LDC with OIS being performed. The LDC may be accurate in removing lens distortions in the presence of OIS.

An example method for performing EIS may include obtaining OIS information for OIS performed during capture of a sequence of frames by an image sensor. The method also includes determining an EIS filter based on the OIS information. In some implementations, the method may include obtaining camera position information, and the EIS filter may also be based on the camera position information. In some implementations, the method may include configuring an image signal processor to perform EIS based on the EIS filter.

In some implementations, the position of the movable camera lens is with reference to the image sensor. The method may include determining an LDC transform based on the positions of the moveable camera lens during capture of the sequence of frames, and the EIS filter is based on the LDC transform. In this manner, LDC may be accurately performed with OIS also being performed.

An example computer-readable medium may store instructions that, when executed by one or more processors of a device, cause the device to obtain OIS information for OIS performed during capture of a sequence of frames by an image sensor. Execution of the instructions also causes the device to determine an EIS filter based on the OIS information. In some implementations, execution of the instructions may cause the device to obtain camera position information, and the EIS filter may also be based on the camera position information.

In some implementations, the position of the movable camera lens is with reference to the image sensor. Execution of the instructions may further cause the device to determine an LDC transform based on the positions of the moveable camera lens during capture of the sequence of frames, and the EIS filter is based on the LDC transform. In this manner, the device may accurately perform LDC with OIS also being performed.

An example device for performing EIS may include means for obtaining OIS information for OIS performed during capture of a sequence of frames by an image sensor. The device also includes means for determining an EIS filter based on the OIS information. In some implementations, the device may include means for obtaining camera position information, and the EIS filter may also be based on the camera position information.

The device may also include means for obtaining camera position information, and the EIS filter is also based on the camera position information. The EIS filter may include a shift function indicating, for each of a plurality of pixel locations in the sequence of frames before processing, a shift of the pixel location in an unprocessed frame to an associated pixel location in a processed frame. The device may also include means for determining an LDC transform based on positions of a moveable camera lens with reference to the image sensor during capture of the sequence of frames. The EIS filter is based on the LDC transform. In this manner, LDC may be accurately performed with OIS also being performed.

The device may include means for determining a rotation transform for reducing rolling shutter distortion. The rotation transform is based on a difference between an angle of the image sensor at read out of each image sensor pixel and an angle of the image sensor at read out of the center image sensor pixel. The EIS filter is based the rotation transform.

BRIEF DESCRIPTION OF THE DRAWINGS

Aspects of the present disclosure are illustrated by way of example, and not by way of limitation, in the figures of the accompanying drawings and in which like reference numerals refer to similar elements.

DETAILED DESCRIPTION

Aspects of the present disclosure may be used for image stabilization for image or video capture. In some example implementations, electronic image stabilization is combined with optical image stabilization in processing a sequence of frame captures.

Many cameras (such as cameras included in handheld devices, including smartphones, tablets, digital cameras, and so on) may have a global movement during video capture. For example, a user's hand may shake, or the user may rotate the camera to capture a different direction. The camera movement or motion may include one or more of a translation motion (such as along one or more axes without rotation) or a rotation motion (such as one or more of a roll, pitch, or yaw). A camera captures a sequence of frames to capture a video, and camera movement during the capture may cause a scene to jump between frame captures. For example, the scene may shift based on a translation motion, and the scene may rotate based on a rotation motion. If the frame rate of the camera is not fast enough, the scene may appear blurry in the video as a result of the camera movement.

Additionally, a camera may include a lens to focus light on an image sensor. The curvature of the lens or lens imperfections may cause light from the scene to refract to the image sensor so that the scene appears distorted in the video. For example, the light intensity at the corners of an image sensor may be less than the light intensity at the center of the image sensor as a result of the lens refracting light toward the center of the image sensor. In another example, a portion of the scene captured by the edges of an image sensor may appear warped as a result of the additional curvature at the edge of the lens as compared to the center of the lens (such as a fisheye effect in frames).

Another distortion may be attributed to a rolling shutter of a camera. If a camera has a global shutter, all pixels of an image sensor are read at one time instance. In this manner, each pixel captures the scene at the same instance in time. However, many cameras have a rolling shutter. For a rolling shutter, only a portion of the pixels of the image sensor are read out at one time. As a result, multiple read outs occur in succession to capture a frame. For example, readouts of the pixels may snake from a top left pixel of the image sensor to a bottom right pixel of the image sensor. In this manner, the top left pixel captures the scene at a time instance earlier than when the bottom right pixel captured the scene. The different instances in capture as a result of the rolling shutter may cause motion blur in the frame.

Figure 1:
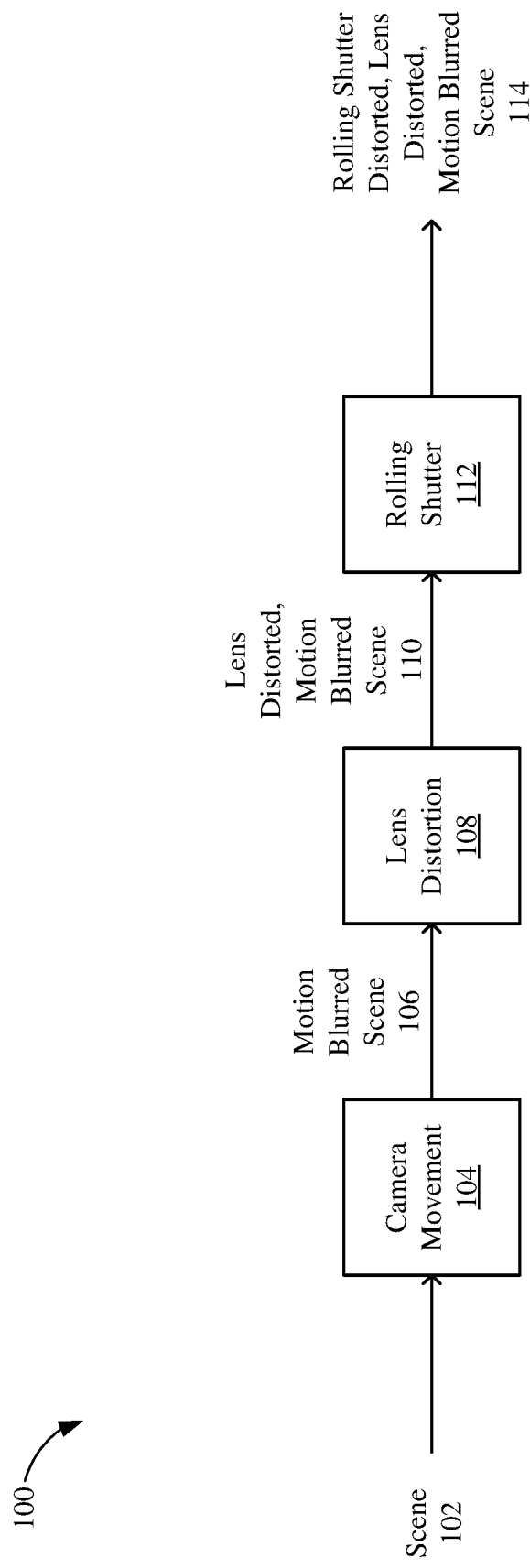
FIG. 1 shows a flow diagram of different distortions added during frame captures.

FIG. 1 shows a flow diagram 100 of different distortions added during frame captures. Scene 102 is to be captured in a frame by a camera. If the camera has camera movement 104, the scene 102 is a motion blurred scene 106 as a result of the camera movement 104. Additionally, the motion blurred scene 106 has lens distortion 108 added to result in a lens distorted, motion blurred scene 110. If the camera has a rolling shutter 112, what the camera's image sensor captures is a rolling shutter distorted, lens distorted, motion blurred scene 114.

Electronic image stabilization (EIS) is a post-capture processing of the frames to reduce one or more of the distortions during capture. For example, EIS may compensate for a camera's global motion to reduce shakiness in the video. EIS may also be used to reduce distortions caused by a rolling shutter. As used herein, EIS may also refer to a reduction in lens distortions (such as a transform or mapping of pixels in the captured frame to a true position in the scene in order to de-warp the captured frame). In some examples of EIS to reduce global motion, a size of each final image in the final image stream for a video may be smaller than the size of the frames being captured by the camera sensor. For example, a device may crop a portion (such as 10 percent) of each of the captured frames (with the cropping location moving based on the global motion) to generate a final, processed stream of images that are a fraction in pixel size of the frames captured by the camera sensor. As noted, the cropping window may be shifted to compensate for camera motion. For example, if the camera moves from left to right, the cropping window may move from right to left in the captured frames. A frame may also be rotated, stretched, or otherwise adjusted to compensate for rotation motion.

Since EIS is a post-capture process, EIS may not compensate for some motion blurs. For example, if a blur in a frame is caused by motion and the frame rate of the image sensor, EIS may not be able to adequately compensate for the motion blur. Such motion blur may also increase when an exposure window increases for a frame (such as when an International Organization for Standardization (ISO) setting of the camera is decreased from 800 to 100).

Another means to reduce one or more of the distortions during capture is optical image stabilization (OIS). In some implementations of OIS, one or more components of a camera may be moved to compensate for camera motion. For example, a device may move the camera lens to counteract a user's hand shaking during video capture. A camera may be coupled to a motion sensor, such as a gyroscope, to indicate the motion of the camera during image capture, and the camera may adjust the camera lens position based on the gyroscope's measurements.

Figure 2:
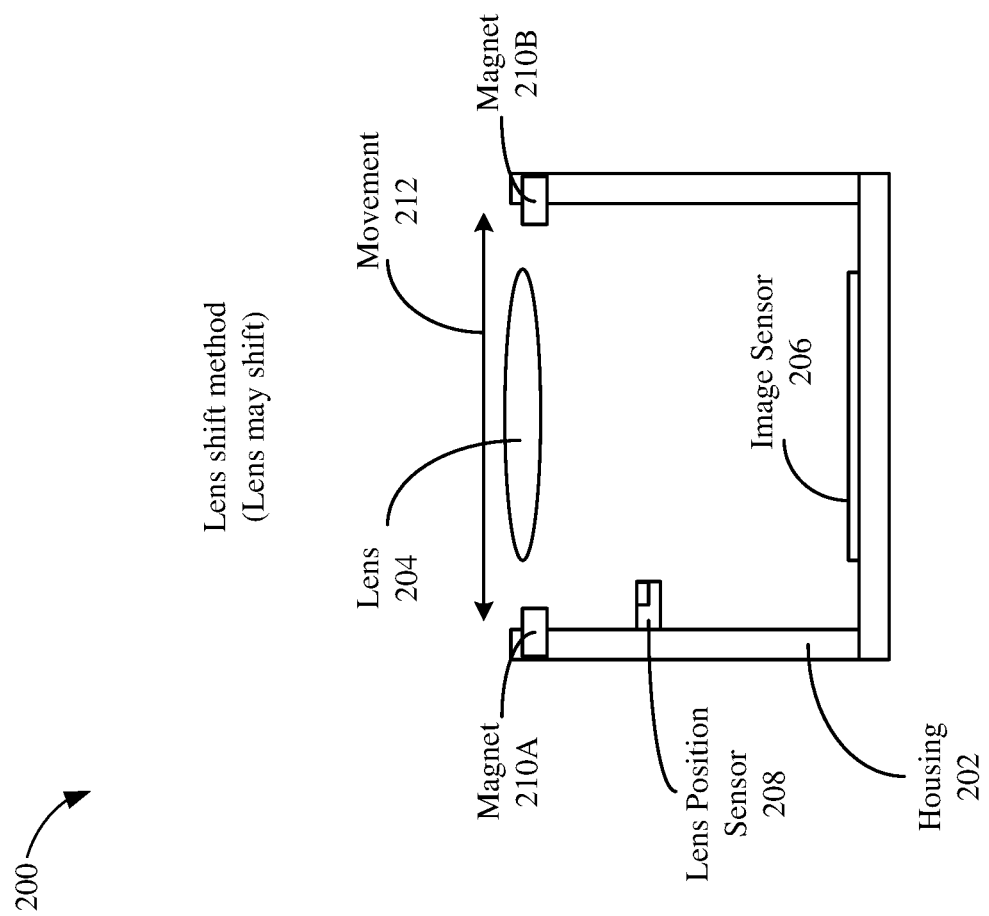
FIG. 2 shows a depiction of an example optical image stabilization system including a shifting lens.

Types of OIS include a lens shift OIS and a module tilt OIS. FIG. 2 shows a depiction of an example lens shift OIS system 200 for a camera. The system may be included in a camera housing 202, and the system may include a shiftable lens 204 (which may move as indicated by movement 212 with reference to the image sensor 206). While the movement 212 is depicted as along an axis in FIG. 2, the movement 212 may be along a plane (i.e., in two perpendicular directions) in three dimensional space.

In some implementations, the system 200 uses one or more magnets (such as magnets 210A and 210B) to shift the lens 204. While magnets 210A and 210B are illustrated, other means to shift the lens 204 may be used, such as a mechanical means (e.g., a pushing or pulling mechanism) or an electrical means (e.g., shifting the lens 204 based on an electrical charge). The system 200 may include a lens position sensor 208 to determine the lens position with reference to the image sensor 206. In some implementations, the lens position sensor 208 may be a Hall effect sensor (also referred to as a hall sensor) to indicate a position of the lens 204. For example, the lens position may be based on an intensity of the magnetic field caused by the magnets 210A or 210B (or other magnets). The hall sensor measures the intensity of the magnetic field and outputs a voltage corresponding to the intensity of the magnetic field. In this manner, a hall sensor measurement may be compared to a gyroscope measurement (after converting to a common measurement system) to determine if the lens 204 is to be shifted. The system 200 may then control the magnets to shift the lens 204.

Figure 3:
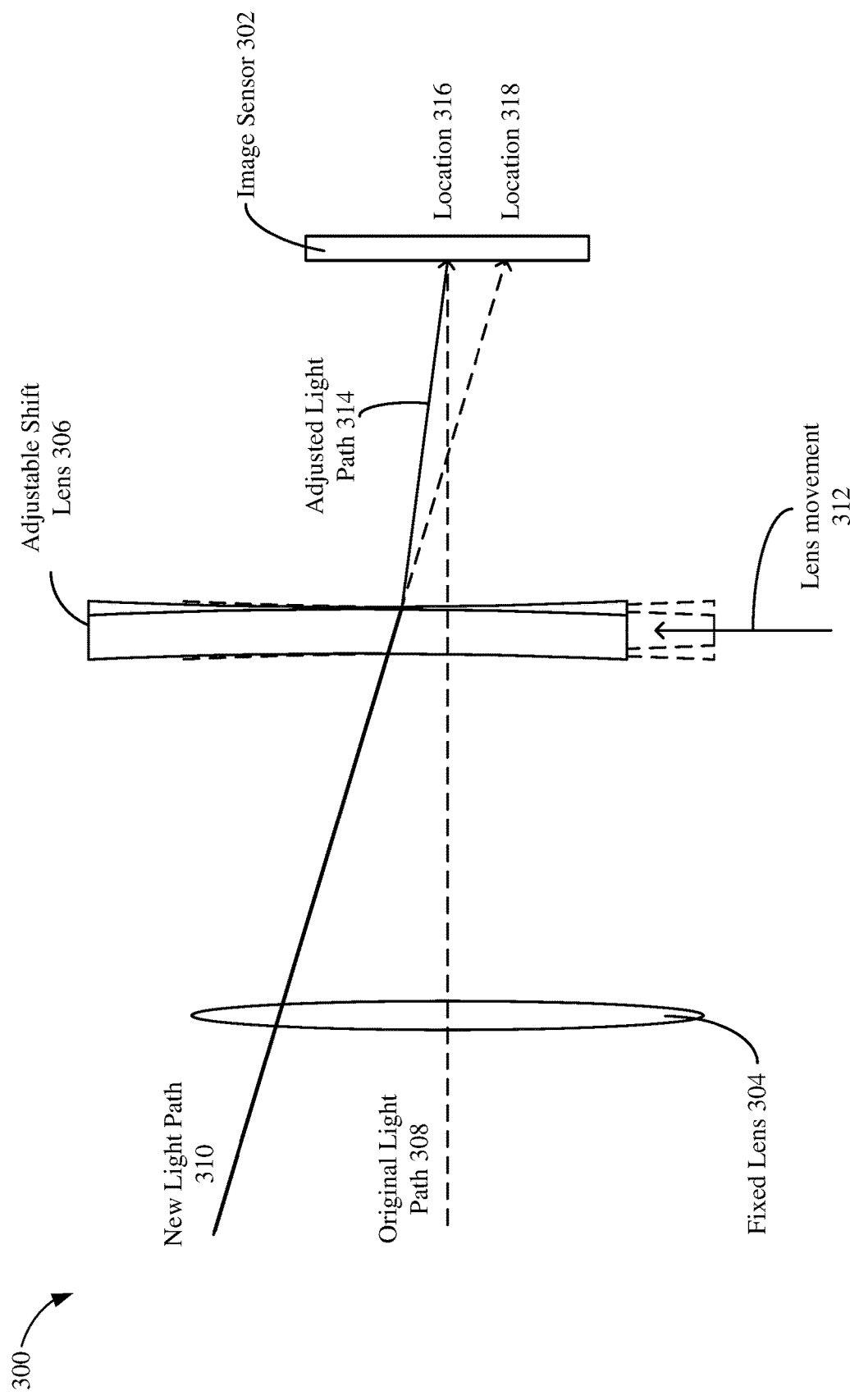
FIG. 3 shows a depiction of example light steering based on optical image stabilization using a shifting lens.

In some implementations, the lens 204 includes a concave lens to direct light to a different portion of the image sensor 206 based on the lens position. FIG. 3 shows a depiction 300 of example light steering based on lens shift OIS. The example OIS system includes a fixed lens 304 (with reference to the image sensor 302) and an adjustable shift lens 306 (which may be referred to as a shiftable lens or an adjustable lens). The curvature of the adjustable lens 306 may be concave (as illustrated) to steer light toward the image sensor 302. In the illustration, the image sensor 302 is originally oriented 90 degrees relative to the light path from an object being captured (original light path 308), and the adjustable lens 306 is at a neutral or centered position (indicated by the dashed outline). As a result, light from an object along the original light path 308 is directed by the fixed lens 304 and the adjustable lens 306 to the camera sensor location 316. When the camera moves, light from the object follow new light path 310. If the adjustable lens 306 is not shifted, the light along the new light path 310 may be directed to location 318 of the image sensor 302.

However, the camera sensor 302 is to appear in the captured frames to remain 90 degrees relative to the object. As a result, the light along new light path 310 is to reach the image sensor 302 at location 316 (same as for the original light path 308). To compensate for the camera motion, the system 300 may adjust the position of the adjustable lens 306 (as indicated by lens movement 312), and the combination of the lens curvatures of the fixed lens 304 and the adjustable lens 306 directs light from the new light path 310 along the adjusted light path 314 to location 316 of the image sensor 302.

A mapping between gyroscope measurements and the adjustable lens position may be used to determine the direction and magnitude of movement 312. In determining the magnitude and direction of lens movement 312, the gyroscope may be sampled to determine the change in position and orientation of the image sensor 302, and the mapping is used to convert the change in position and orientation to a movement 312.

Figure 4:
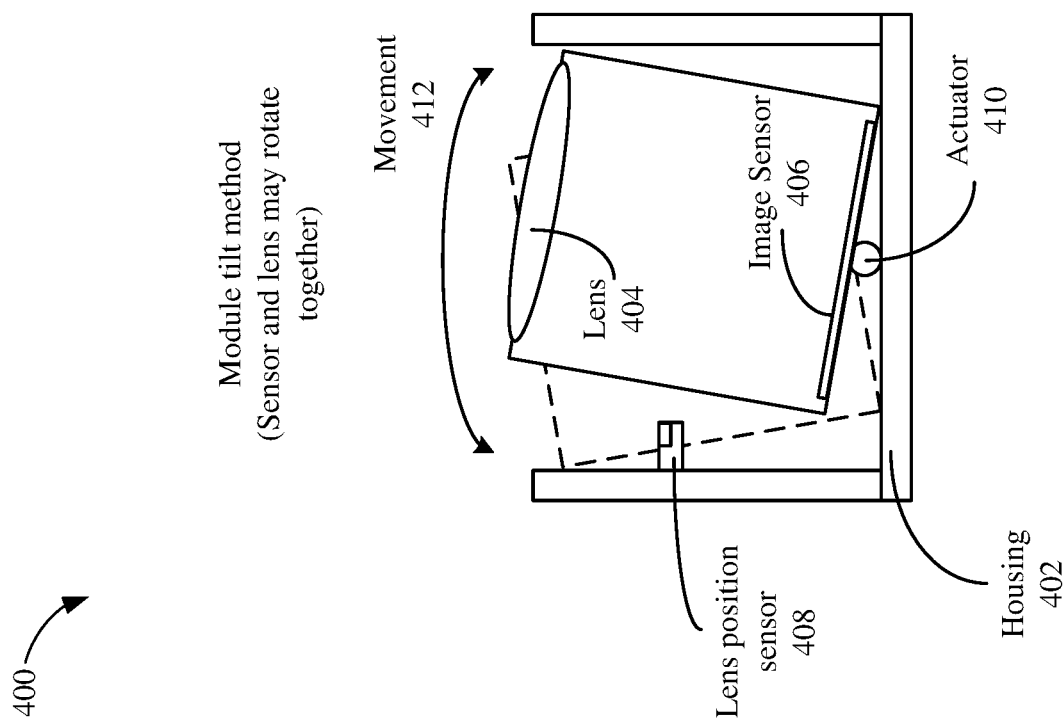
FIG. 4 shows a depiction of an example optical image stabilization system including a rotating lens and image sensor.

Another type of OIS is a module tilt OIS (which may also be referred to as a rotation based OIS or rotation OIS). FIG. 4 shows a depiction of an example module tilt OIS system 400. The system 400 may be included in a camera housing 402. The system 400 includes a lens 404 with a fixed position with reference to the image sensor 406, and the lens 404 and the image sensor 406 may tilt or rotate (as indicated by movement 412). In some implementations, the system 400 may use an actuator or other rotation means to rotate the lens 404 and the image sensor 406. Similar to the lens shift method, the lens 404 and image sensor 406 may be rotated to keep light from an object fixed at a location on the image sensor 406 during camera movement.

The system 400 may include a lens position sensor 408 to determine the lens position (such as the rotation angle). In some implementations, the lens position sensor 408 is a photodetector, for which the light intensity measured by the photodetector indicates the lens position. For example, if the lens position is as indicated by the dashed box, the photodetector is covered, and no light reaches the photodetector. If the lens position is on the opposite end (as illustrated), the photodetector is not covered and the light intensity is at its greatest at the photodetector. Intermediate lens positions are thus associated with intermediate light intensity measurements. In another example, a sensor may measure a rotation at the actuator 410 to determine a lens position. Any other suitable means for determining a lens position may also be used.

In this manner, a lens position sensor measurement may be compared to a gyroscope measurement (after converting to a common measurement system) to determine if the lens 404 is to be shifted (by rotating the lens 404 and the image sensor 406). The system 400 may then control the actuator 410 to rotate the lens 404 and the image sensor 406.

In some implementations, the sampling rate of the gyroscope may be 6 kilohertz (kHz), and the lens 204 (FIG. 2) may be configured to be shifted or the lens 404 (FIG. 4) may be configured to be rotated at the same rate. In this manner, for a camera capturing video at, e.g., 24 to 120 frames per second (fps), the camera lens 204 or 404 may be adjusted tens to hundreds of times for each frame capture. In this manner, each frame may be stabilized to reduce blur within the frame.

While OIS may sometimes be better at reducing camera blur that EIS, the range of camera lens movement for OIS is limited by design and physical constraints. For example, the limitations on lens movement may restrict OIS to compensate for up to approximately one degree of camera movement. In contrast, EIS may compensate for up to five degrees or more of camera movement. However, cameras are limited to performing either OIS or EIS for image stabilization.

In some implementations, OIS is combined with EIS to improve image stabilization. While OIS may reduce one or more distortions caused by camera movement, OIS may introduce different factors or distortions for EIS. In some implementations, the lens positions during OIS are used to determine an EIS during post-capture processing.

Figure 5:
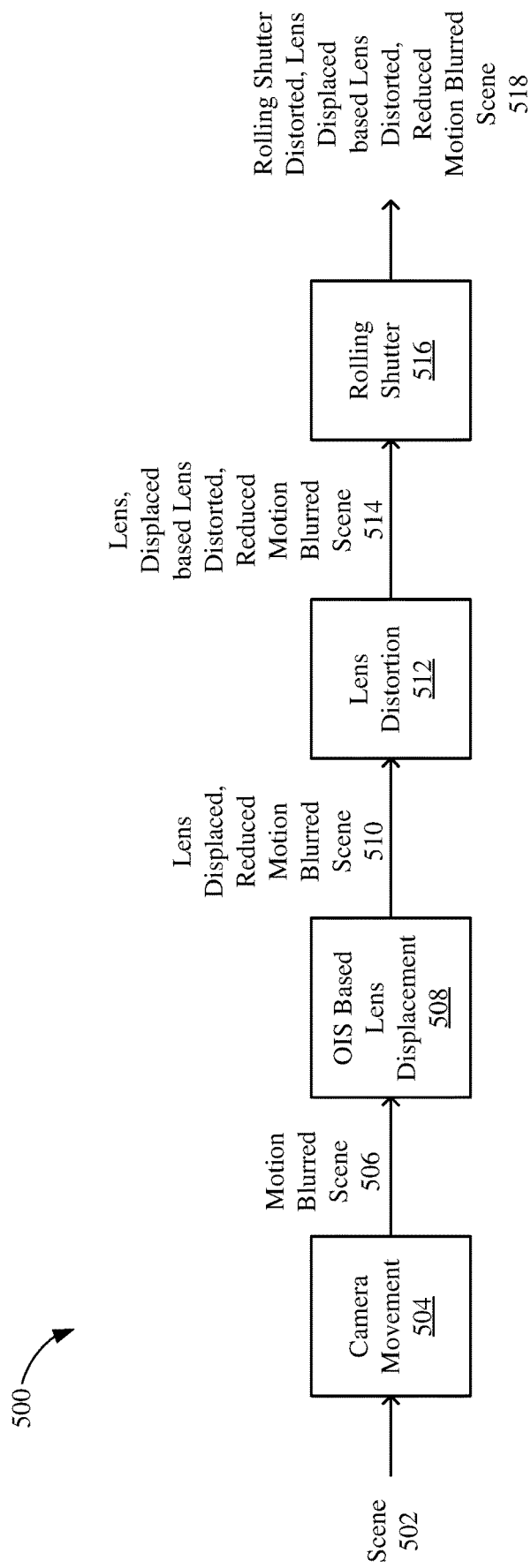
FIG. 5 shows a flow diagram of different distortions added during frame captures when optical image stabilization is performed.

FIG. 5 shows a flow diagram 500 of different distortions added during frame captures when OIS is performed. Similar to FIG. 1, a scene 502 may be affected by camera movement 504 to result in a motion blurred scene 506. OIS may move the lens to reduce motion blur (indicated by OIS Based Lens Displacement 508), but the lens displacement may cause a change in lens distortion. Thus, the lens displaced, reduced motion blurred scene 510 may have a varying lens distortion 512 (based on the change in lens position) to cause a lens displaced based lens distorted, reduced motion blurred scene 514. The rolling shutter 516 may cause distortion (which may be reduced by OIS) but may still exist. The OIS lens displacement may also affect the distortion caused by the rolling shutter. As a result, the camera's image sensor may capture a rolling shutter distorted, lens displacement based lens distorted, reduced motion blurred scene 518. As noted above, lens displacement for OIS may be quicker than frame capture. In some implementations, EIS is configured to account for multiple lens positions for each captured frame. In combining OIS and EIS for video capture, image stabilization is improved with reference to OIS or EIS alone.

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well-known circuits and devices are shown in block diagram form to avoid obscuring teachings of the present disclosure. Some portions of the detailed descriptions which follow are presented in terms of procedures, logic blocks, processing and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory and the like.

Aspects of the present disclosure are applicable to any suitable electronic device capable of capturing video (such as security systems, smartphones, tablets, laptop computers, digital video and/or still cameras, web cameras, VR headsets, AR headsets, and so on with one or more cameras). While described below with respect to a device having or coupled to one camera, aspects of the present disclosure are applicable to devices having any number of cameras, and are therefore not limited to devices having one camera.

The term "device" is not limited to one or a specific number of physical objects (such as one smartphone, one camera controller, one processing system and so on). As used herein, a device may be any electronic device with one or more parts that may implement at least some portions of the disclosure. While the below description and examples use the term "device" to describe various aspects of the disclosure, the term "device" is not limited to a specific configuration, type, or number of objects.

Figure 6:
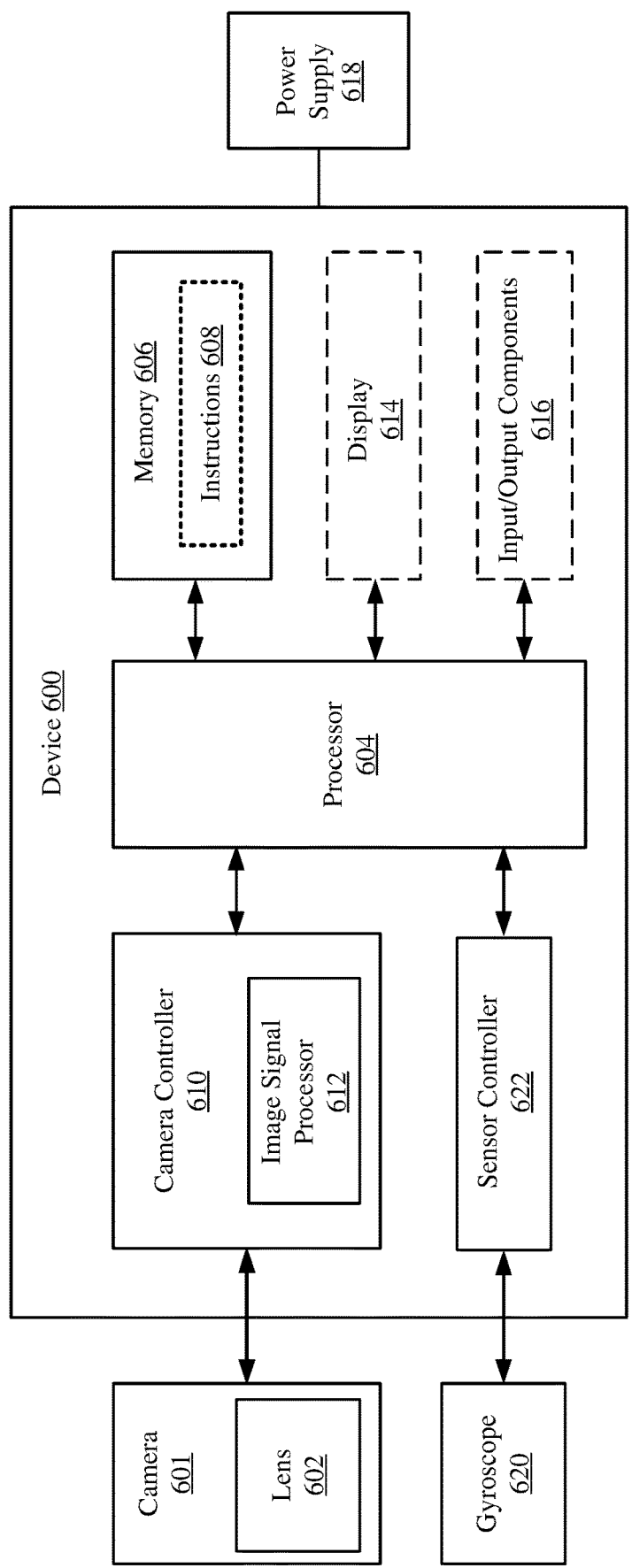
FIG. 6 shows a block diagram of an example device configured to perform optical image stabilization and electronic image stabilization.

FIG. 6 shows a block diagram of an example device 600 for performing OIS and EIS. The example device 600 may include or be coupled to a camera 601, a gyroscope 620, a processor 604, a memory 606 storing instructions 608, a camera controller 610, and a sensor controller 622. The device 600 may optionally include (or be coupled to) a display 614 and a number of input/output (I/O) components 616. The device 600 may include additional features or components not shown. For example, a wireless interface, which may include a number of transceivers and a baseband processor, may be included for a wireless communication device. The device 600 may include or be coupled to additional cameras other than camera 601 and additional sensors other than gyroscope 620.

The camera 601 may be capable of capturing a sequence of image frames (which may be referred to as frames or images) for video capture. The camera 601 includes an image sensor and at least one camera lens 602 associated with the image sensor. The camera 601 may be configured for OIS, and the position of the lens 602 may be adjustable (such as by shifting or rotating the lens 602).

The gyroscope 620 may be capable of providing information regarding a position of the camera 601 (such as a location due to translation motion and an orientation due to rotation motion). As used herein, position information may account for translation motion and rotation motion of the camera 601. In some implementations, the device 600 may be configured to sample the gyroscope 620 (such as via the sensor controller 622) to obtain position information of the camera 601 during frame capture by the camera 601. In this manner, the device 600 is configured to use the gyroscope measurements to determine the lens movements for OIS. For example, the camera controller 610 may provide instructions to the camera 601 for controlling OIS during video capture. While not shown, the sensor controller 622 may be coupled directly to the camera controller 610, or the gyroscope measurements may be provided to the camera controller in another manner than as illustrated for controlling OIS. Additional or alternative motion sensors may be included or coupled to the device 600, such as an accelerometer, magnetometer, and so on. In some implementations, the sensor controller 622 is a sensor hub for receiving measurements from a plurality of sensors.

The device 600 may be configured to perform EIS on the sequence of frames post-capture. In some implementations, the image signal processor 612 is configured to receive the sequence of captured frames and perform EIS. In this manner, the image signal processor 612 may configure the EIS to be performed (such as adjusting one or more EIS filters) based on the gyroscope measurements received by the camera controller 610. The image signal processor 612 may also configure the EIS to be performed based on the positions of the lens 602 during the capture of the sequence of frames.

The memory 606 may be a non-transient or non-transitory computer readable medium storing computer-executable instructions 608 to perform all or a portion of one or more operations described in this disclosure (such as for performing OIS or EIS). The device 600 may also include a power supply 618, which may be coupled to or integrated into the device 600.

The processor 604 may be one or more suitable processors capable of executing scripts or instructions of one or more software programs (such as instructions 608) stored within the memory 606. For example, the processor 104 may execute operations for OIS or EIS (such as determining a configuration for the image signal processor 612 to perform EIS). In some aspects, the processor 604 may be one or more general purpose processors that execute instructions 608 to cause the device 600 to perform any number of functions or operations. For example, the processor 604 may be an application processor of device 600 (such as for a smartphone or other computing device). In additional or alternative aspects, the processor 604 may include integrated circuits or other hardware to perform functions or operations without the use of software. In some implementations, the camera controller 610 may be configured to execute operations for OIS or EIS, which may include executing instructions 608 or instructions stored locally in the camera controller 610.

While shown to be coupled to each other via the processor 604 in the example of FIG. 6, the processor 604, the memory 606, the camera controller 610, the sensor controller 622, the optional display 614, and the optional I/O components 616 may be coupled to one another in various arrangements. For example, the processor 604, the memory 606, the camera controller 610, the sensor controller 622, the optional display 614, and/or the optional I/O components 616 may be coupled to each other via one or more local buses (not shown for simplicity).

The display 614 may be any suitable display or screen allowing for user interaction and/or to present items (such as captured images or video) for viewing by a user. In some aspects, the display 614 may be a touch-sensitive display. The I/O components 616 may be or include any suitable mechanism, interface, or device to receive input (such as commands) from the user and to provide output to the user. For example, the I/O components 616 may include (but are not limited to) a graphical user interface, keyboard, mouse, microphone and speakers, and so on.

The camera controller 610 may include an image signal processor 612, which may be one or more image signal processors to process captured image frames captured by the camera 601. The camera controller 610 (such as the image signal processor 612) may perform operations associated with OIS and/or EIS, and process or generate processed image frames for a video. The camera controller 610 may also include an encoder to encode the processed video. In some other implementations, the encoder may be executed by the processor 604 to encode the video. The encoded video may be in a format for playback or storage by the device 600 or another suitable device. As noted, the camera controller 610 may also control operation of the camera 601. In some implementations, the camera controller 610 (such as the image signal processor 612) may adjust or instruct the cameras to adjust one or more camera components for OIS (such as adjusting the camera lens 602). For example, the camera controller 610 may obtain measurements from a lens displacement sensor of the camera 601, obtain measurements from the gyroscope 620, and provide specific instructions to one or more components of the camera 601 to move the lens 602. In some other implementations, the camera 601 is configured to receive the gyroscope measurements and move the lens 602 during OIS.

In some aspects, the image signal processor 612 may execute instructions from a memory (such as instructions 608 from the memory 606 or instructions stored in a separate memory coupled to the image signal processor 612) to process frames captured by the camera 601. In some other aspects, the image signal processor 612 may include specific hardware. The image signal processor 612 may alternatively include a combination of specific hardware and the ability to execute software instructions.

The sensor controller 622 may be configured to sample the gyroscope 620 (and other sensors coupled to the sensor controller 622). In some aspects, the sensor controller 622 may include one or more processors to execute instructions from a memory (such as instructions 608 from the memory 606 or instructions stored in a separate memory coupled to or included in the sensor controller 622). In some other aspects, the sensor controller 622 may include specific hardware. The sensor controller 622 may alternatively include a combination of specific hardware and the ability to execute software instructions. In some implementations, portions of the sensor controller 622 may be embodied in other components of the device 600, such as the processor 604, the camera controller 610, or the camera 601.

The device 600 is configured to perform OIS during frame capture to compensate for at least a portion of camera motion, and the device 600 is configured to perform EIS after frame capture to compensate for the camera motion and other distortions (such as lens distortion). As noted herein, OIS may cause separate distortions or otherwise affect EIS. For example, if OIS causes the lens 602 to move during frame captures, the positioning of the lens distortion with reference to the image sensor (and the frames captured) changes. The device 600, in combining EIS with OIS, is configured to account for changes in the camera lens position for performing EIS.

Figure 7:
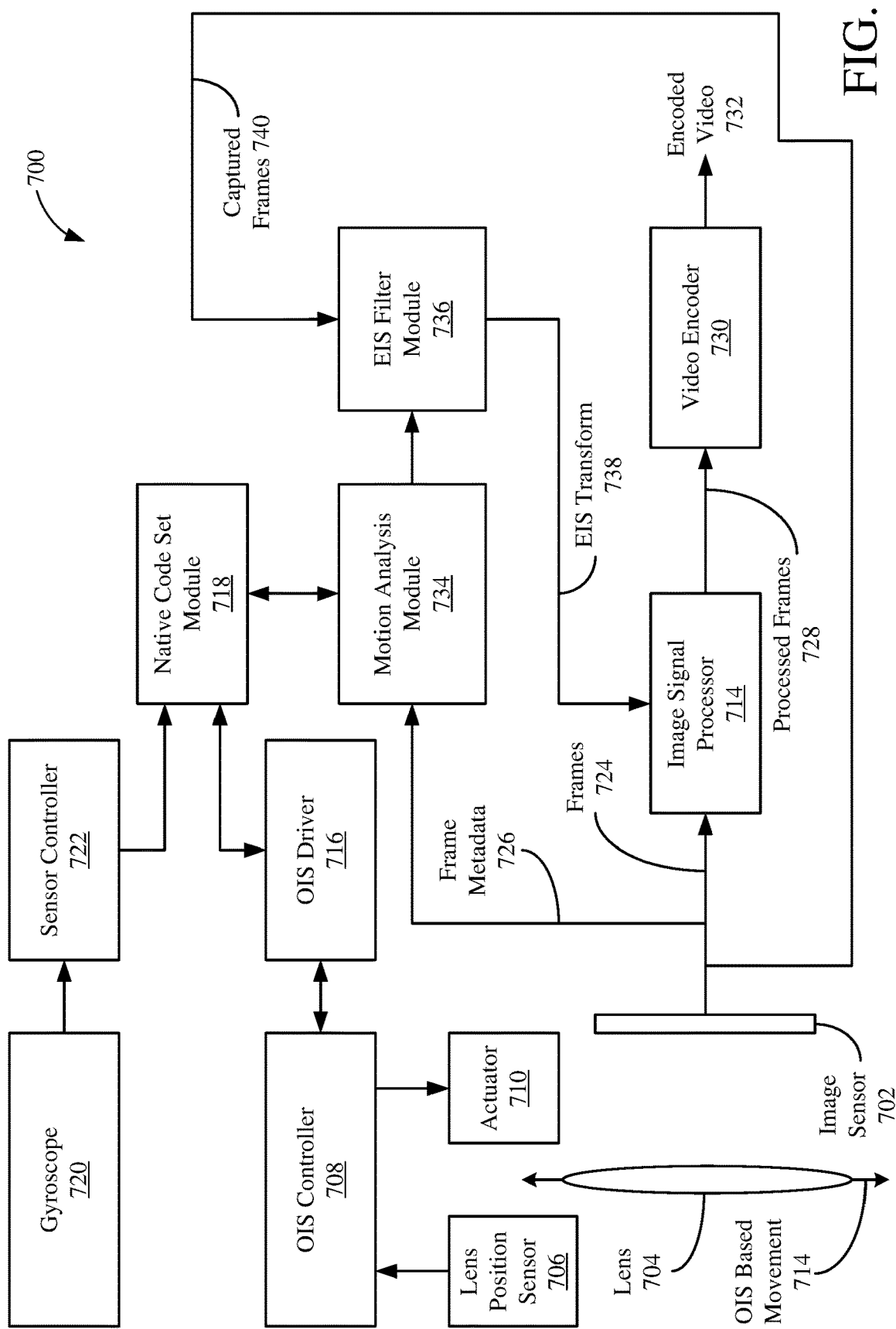
FIG. 7 shows a block diagram of an example system for configuring electronic image stabilization based on optical image stabilization that was performed.

FIG. 7 shows a block diagram of an example system 700 for configuring EIS based on OIS that was performed during frame capture. Portions of the example system 700 may be embodied in the camera controller 610, sensor controller 622, processor 604, memory 606, camera 601, or any other suitable component of the device 600 in FIG. 6. Each of the blocks in system 700 may be embodied in hardware, software, or a combination of both. As such, the block diagram in FIG. 7 is for illustrative purposes in explaining aspects of the disclosure, and the disclosure is not limited to the configuration of the illustrated example system 700.

Gyroscope 720 may be an implementation of the gyroscope 620 in FIG. 6. The sensor controller 722 may be an implementation of the sensor controller 622 in FIG. 6. The sensor controller 722 may sample the gyroscope 720 (e.g., at a sampling rate of 6 kHz or another suitable rate), and the sampling may be during frame capture by the image sensor 702. During frame capture, the system 700 is configured to perform OIS. During OIS, the OIS driver 716 may communicate with the OIS controller 708 to control movement of the lens 704 via the actuator 710. The OIS driver 716 may be implemented in hardware, software, or a combination of both, and may be implemented in the camera controller 610, the processor 604, or another suitable component of the device 600 in FIG. 6. The OIS controller 708 may be implemented in hardware, software, or a combination of both, and may be implemented in the camera 601, the camera controller 610 or another suitable component of the device 600. Movement of the lens 704 may be based on a lens shift OIS or a module tilt OIS. For module tilt OIS, the actuator 710 may be an example implementation of the actuator 410 in FIG. 4. While an actuator 710 is illustrated for controlling movement of the lens 704, any suitable component may be used. For example, one or more magnets (such as magnets 210A or 210B in FIG. 2), a current generator, or other means to physically move the lens 704 may be used by the OIS system. Movement 714 indicates an example motion that lens 704 may perform during OIS. While the illustrated movement 714 may resemble motion with reference to the image sensor 702 for lens shift OIS, any suitable lens movement (including rotating both the lens 704 and the image sensor 702) may be performed in performing OIS.

The OIS controller 708 obtains lens position measurements from the lens position sensor 706. In some examples, the lens position sensor 706 includes a hall effect sensor or a photodetector. For example, for a lens shift OIS using magnets to shift the lens 704, the OIS controller 708 may obtain voltages from a hall effect sensor (measuring a magnetic field) to determine a lens position (or may obtain a representation of the voltage after conversion (such as to a digital format)). The OIS controller 708 provides the measurements to the OIS driver 716, and the OIS driver 716 provides indications of the lens positions to the native code set (NCS) module 718. The OIS controller 708 and the OIS driver 716 may also use values from the gyroscope 720 or values from the image sensor 702 to determine and control the movements of the lens 704 via the actuator 710 during OIS.

The NCS module 718 is configured to convert different measurements to a common unit or to a unit recognized by a different module. The NCS module 718 may be implemented in the camera controller 610, the processor 604, or another suitable component of the device 600 and may be implemented in hardware, software, or a combination of both. In some implementations, the NCS module 718 may convert a gyroscope measurement to a lens position measurement. For example, the NCS module 718 may convert a gyroscope measurement to a digital representation of a voltage that would be provided by a hall effect sensor. The NCS module 718 may provide the representation to the OIS driver 716, and the OIS driver 716 compares the representation from the NCS module 718 and the voltage indication from the OIS controller 708 to determine a value to provide to the OIS controller 708 to control the actuator 710. In another example, the NSC module 718 converts the gyroscope measurement from the sensor controller 722 and converts the lens position sensor measurement from the OIS driver 716 to values in a common unit so that the values may be compared to one another. In some implementations, the NCS module 718 includes a look-up table, a script, or other suitable means to map various values from different modules to a value for other modules or a common value. The common units may be called a native code set herein. The NCS module 718 provides the NCS (including translated values for the lens position measurements and translated values for the gyroscope measurements) to the motion analysis module 734.

The motion analysis module 734 may be configured to compare the camera motion indicated by the gyroscope 720 and the lens motion indicated by the lens position sensor 706. The motion analysis module 734 may then provide a comparison between the lens position sensor measurements and the gyroscope measurements with reference to the frame metadata 726 from the image sensor 702 to the EIS filter module 736. The EIS filter module 736 may determine an EIS to be performed based on the unprocessed, captured frames 740 from the image sensor 702 and the comparison from the motion analysis module 734.

The motion analysis module 734 may be included in an EIS library for configuring the EIS transform 738. The EIS library may be implemented in the camera controller 610, the processor 604, or another suitable component of the device 600 and may be implemented in hardware, software, or a combination of both. The EIS library may include a look-up table, mapping, or other calculations of NCS and frame metadata to values (indicating the comparison) that are to be passed to the EIS filter module 736 for configuring the EIS transform 738. Example calculations or mappings are described with reference to example methods below for determining an EIS. The EIS filter module 736 determines the EIS by generating the EIS transform 738 based on the captured frames 740 and the values from the motion analysis module 734.

The image signal processor 714 is configured, based on the EIS transform 738, to perform EIS on the frames 724. In some implementations, the frames 724 are the same as frames 740. In some implementations, frames 740 may be previous instances of frames 724 (such as for determining parameters for the EIS to evaluate the EIS before using on current frames 724). In some implementations, the frames 740 may be obtained from a memory or buffer.

One or more filters, or components specific to EIS, of the image signal processor 714 may be configured using the EIS transform 738. The image signal processor 714 processed the frames 724, including performing EIS. Other processing may include denoising, edge enhancement, color balance, or other suitable image processing filters. The image signal processor 714 may be an example implementation of the image signal processor 612 of the device 600 in FIG. 6. In some other implementations, another suitable component of the device 600 may be configured to perform EIS.

The video encoder 730 encodes the processed frames 728 to generate the encoded video 732. The encoded video 732 may be provided for viewing, storage, or transmission (such as to another device). The video encoder 730 may be implemented in the image signal processor 612, another portion of the camera controller 610, the processor 604 (such as in instructions 608 to be executed by the processor 604 or another suitable processor), or another suitable component of the device 600. The video encoder 730 may be implemented in hardware, software, or a combination of both.

Figure 8:
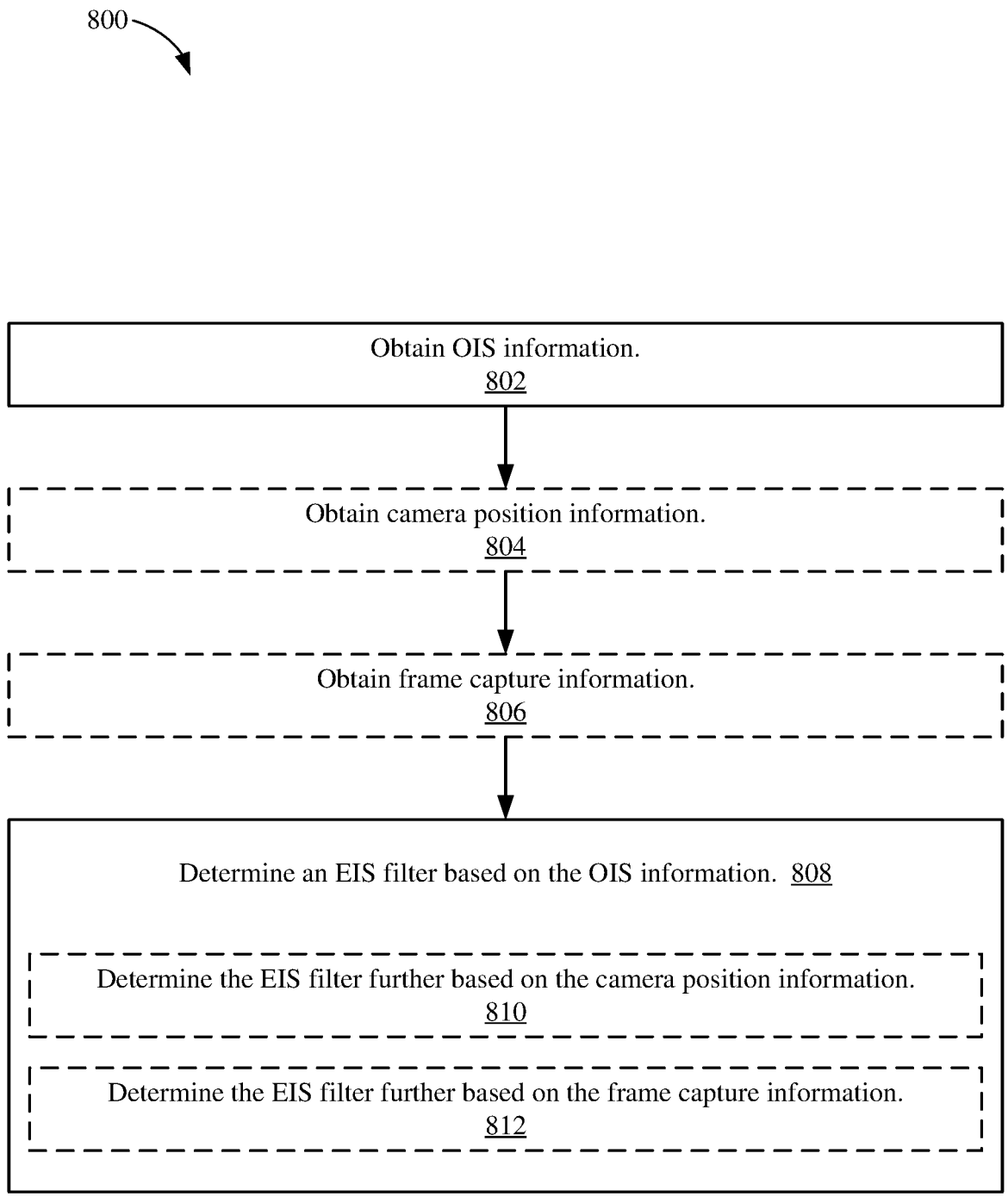
FIG. 8 shows an illustrative flow chart depicting an example operation for performing electronic image stabilization based on optical image stabilization that was performed.

FIG. 8 shows an illustrative flow chart depicting an example operation 800 for performing EIS based on OIS. Referring back to FIG. 7, in determining the EIS based on the OIS performed, the EIS transform 738 complements the OIS performed to provide a desired combined image stabilization processing of the frames 724. The example operation 800 in FIG. 8 may be performed by the device 600 in FIG. 6 (such as the system 700 in FIG. 7). While the examples are described with reference to being performed by the device 600, any suitable device or system may be used to perform example operation 800 (or the other example operations).

At 802, the device 600 obtains OIS information. Referring to FIG. 6, the camera controller 610 (or processor 604) may obtain an indication of the lens position sensor measurements regarding the movement or position of lens 602. For example, the lens position sensor measurements (such as hall sensor measurements) may be converted to a distance (such as a pixel distance). The distances may then be converted to values in the NCS. The OIS information may include the distance values in the NCS (or otherwise an indication of the lens position based on the lens position sensor measurements). Referring to FIG. 7, the motion analysis module 734 may obtain NCS of the lens position measurements.

In some implementations, the device 600 may also obtain camera position information (804). Referring to FIG. 6, the camera controller 610 (or processor 604) may obtain gyroscope measurements from the sensor controller 622. Referring to FIG. 7, the motion analysis module 734 may obtain NCS of the gyroscope measurements. In some implementations, the camera position information may include indications of the camera position based on the gyroscope measurements. For example, the gyroscope measurements may be converted to a rotation of the camera 601 (which may be represented by one or more Euler angles or a quaternion). The measurements may also indicate a location of the camera (such as based on a translation motion). The determined rotations of the camera 601 (such as the Euler angles or the quaternions) may be converted to camera position values in the NCS. The camera position information may include camera position values in the NCS.

In some implementations, the device 600 may obtain frame capture information (806). Referring to FIG. 6, the camera 601 captures a sequence of frames for capturing video, and the camera controller 610 (or processor 604) obtains metadata from the frames. For example, the frames may be in an exchangeable image file format (EXIF), and each EXIF header (or another suitable location in each frame) may include metadata about the frames. Metadata may include color palette, color scheme (such as RGB or YuV), light intensity, or other frame information for rendering the frame as an image (or which may otherwise affect EIS).

At 808, the device 600 determines an EIS filter based on the OIS information. Referring to FIG. 6, the camera controller 610 (or processor 604) may determine a configuration of the image signal processor 612 to perform EIS based on the OIS performed (indicated by the OIS information). Referring to FIG. 7, the EIS filter module 736 may determine the EIS transform 738 based on the NCS of the lens position measurements (such as based on a processing of the NCS by the motion analysis module 734) to configure the image signal processor 714 to perform EIS.

In one example, the OIS information indicates a lens position of the camera 601. If the device 600 performs lens shift OIS, the lens position may be used to determine a change in the lens distortion. For example, a transform that is centered for a captured frame from the image sensor when the lens 602 is in a neutral position (such as centered for the image sensor), may be shifted based on a shift of the lens 602 during OIS. In this manner, the device 600 may determine a shift of the transform based on a shift of the lens 602. The device 600 may also determine a lens shift's effect on a frame capture during a rolling shutter's read out, and the device 600 may configure the image signal processor 612 to compensate for the moving lens 602 in reversing (or otherwise reducing) the rolling shutter blurring during EIS.

Referring back to FIG. 8, in some implementations of 808, the device 600 may determine the EIS filter further based on the camera position information (810). For example, the gyroscope measurements compared to the lens position measurements may indicate that the camera movement was greater than could be compensated by OIS to keep a scene steady through a sequence of frames. In this manner, the device 600 determines an additional compensation to be performed by EIS for reducing the movement of the scene through the sequence of frames. Referring to FIG. 6, the camera controller 610 (or processor 604) may determine a configuration of the image signal processor 612 to perform EIS based on a comparison of the gyroscope measurements and the lens position measurements (in light of the frame metadata). Referring to FIG. 7, the EIS filter module 736 may determine the EIS transform 738 based on the NCS including the lens position measurements and the gyroscope measurements (such as based on a comparison of the gyroscope measurements and the lens position measurements by the motion analysis module 734) to configure the image signal processor 714 to perform EIS. Referring back to FIG. 8, in some other implementations of 808, the device 600 may determine the EIS filter further based on the frame capture information (812). For example, processing of the NCS (which may include indications of the lens position or camera position) may be based on the frame capture information (such as the frame metadata 726). As such, the EIS transform 738 generated by EIS filter module 736 (FIG. 7) may be based on the frame capture information.

After determining the EIS filter, the device 600 may perform EIS on the captured frames. For example, the image signal processor 612 performs an EIS based on the OIS for frames from the camera 601 to reduce distortions during capture. As noted above, two types of OIS includes lens shift OIS and module tilt OIS. The effect of OIS on the distortions during capture differs based on the type of OIS. For example, referring back to FIG. 5, lens distortion 512 may be more affected by lens shift OIS than module tile OIS since the lens moves with reference to the image sensor. In another example, referring back to FIG. 5, rolling shutter distortions may be more affected by module tilt OIS than lens shift OIS. As a result, the distortions to be reduced by EIS may be determined differently based on the type of OIS performed. Described herein are example implementations for determining the distortions to be reduced by EIS. In some implementations, a profile of the distortion is determined, and the image signal processor 612 is configured to perform an EIS that is an inverse of the distortion profile. The examples are described with reference to lens shift OIS and module tilt OIS.

Lens Shift OIS

For lens shift OIS, a camera lens moves with reference to the image sensor. Referring back to FIG. 7, the lens position sensor 706 indicates a position of the lens 704. In some implementations, the OIS controller 708 or the OIS driver 716 converts a lens position sensor measurement from one unit to a measurement of the lens position with reference to the image sensor 702. For example, the OIS controller 708 or the OIS driver 716 may determine a center of the lens 704 at a pixel position (x, y) of the image sensor 702 based on a lens position sensor measurement. x (in X) may refer to an xth row of the image sensor 702, and y (in Y) may refer to a yth column of the image sensor 702 of size X rows by Y columns. If the lens position sensor 706 is a hall sensor measuring a magnetic field of magnets used to position the lens 704, the OIS controller 708 may convert the voltage generated by the hall sensor to a digital representation. The OIS driver 716 may convert the digital representation to a pixel location (x, y) of the image sensor 702. In some other implementations, the NCS module 718 may convert the digital representation to an NCS indicating a pixel location (x, y) of the image sensor 702. In some implementations, the pixel location may be indicated as a shift (measured in pixels) from the center of the image sensor 702.

An example conversion of a lens position (as indicated by a hall sensor) to a pixel shift is shown in equation (1) below:

$$OIS_{shift}=a+b*OISLensPos+c*OISLensPos^2+d*OISLensPos^3 \quad (1)$$

OISLensPos is the lens position indicated by the hall sensor. $OIS_{shift}$ is the conversion of the lens position to a shift measured in pixels. a, b, c, and d are parameters to be estimated for best converting hall sensor measurements to $OIS_{shift}$. For example, parameters a, b, c, and d may be determined during calibration of the OIS system and the device, and the parameters may be stored for use in conversion during device operation. For example, parameter 'a' may represent a fixed offset of the hall sensor measurement from a zero shift value when the camera lens is in a neutral position. Parameters 'b'-'d' may map a finite impulse response for the conversion. While the conversion is shown up to parameter 'd', any suitable number of parameters may be used, and any suitable impulse response function may be used (such as including $e*OISLensPos^4$ and so on).

$OIS_{shift}$ may be for a lens position measured along a single axis. As such, if the lens moves along a plane for lens shift OIS, two instances of $OIS_{shift}$ may exist (one for each axis defined motion). In some implementations, $OIS_{shift}$ may be a product of two third order polynomial functions (such as a product of two instances of equation (1)). Examples of calibration, as described herein, provide examples of determining the parameters for a combined $OIS_{shift}$ function. Examples of determining an EIS based on an $OIS_{shift}$ use the example function of FIG. 1 for clarity in describing aspects of the disclosure. In some implementations, a combined $OIS_{shift}$ may be used, and the examples are not limited to the shift function shown in equation (1).

In some implementations, the conversion may be based on a focal length of the camera and a conversion of specific hall sensor readings to a unit of distance. For example, the lens 602 being closer to the image sensor of the camera 601 (FIG. 6) may cause the lens shift to appear greater from the perspective of the image sensor than if the lens 602 is farther from the image sensor. In another example, various hall sensors may be used for lens shift OIS, and the hall sensor measurements may be mapped to a distance of lens shift (such as in millimeters (mm)) for the included hall sensor. An example conversion of a hall sensor measurement to a pixel shift based on focal length is shown in equation (2) below:

$$OIS_{shift}=UnitConversion*FocalLengthFactor*(a+b*OISLensPos+c*OISLensPos^2+d*OISLensPos^3) \quad (2)$$

UnitConversion is the conversion of hall sensor readings from a digital representation (such as a specific code for the voltage generated by the hall sensor) to a distance (such as mm). For example, UnitConversion may be conceptualized in terms of mm units and hall sensor readings as in equation (2A) below:

$$UnitConversion = UnitConversion\left[\frac{mm}{\text{hall sensor readings}}\right] \quad (2A)$$

FocalLengthFactor is a factor based on the focal length associated with the image sensor. FocalLengthFactor converts the unit of distance (such as mm) from UnitConversion to length in image sensor pixels of the image sensor. If the unit of distance is mm for UnitConversion, FocalLengthFactor may be as shown in equation (2B) below:

$$FocalLengthFactor = \frac{\text{Focal Length (in pixels)}}{\text{Focal Length (in mm)}} \quad (2B)$$

While UnitConversion is shown outside of the parenthesis to impact all parameters a, b, c, and d, in some implementations, UnitConversion may be included with OISLensPos (thus not impacting parameter a, which may indicate a static offset).

The conversion may also be impacted by the size of the captured frames with reference to the size of the processed frames after EIS (such as the size of cropping for EIS). In this manner, the conversion may need to be scaled. An example scaled conversion of a hall sensor measurement to a pixel shift based on focal length is shown in equation (3) below:

$$OIS_{shift}=Scale*UnitConversion*FocalLengthFactor*(a+b*OISLensPos+c*OISLensPos^2+d*OISLensPos^3) \quad (3)$$

Scale is the factor for scaling the captured frames to the processed frames. In some implementations, parameters Scale, a, b, c, and d may be determined during device configuration (or otherwise determined before operation), stored, and used during image stabilization. In some implementations, one or more of the parameters may be determined by the EIS filter module 736 (FIG. 7) adjusting the parameters for previous captured frames 740 and evaluating the results of processed frames that would result from EIS.

$OIS_{shift}$ may be a value of the lens position shift (also referred to as a lens shift) in pixels. In some implementations, $OIS_{shift}$ may indicate a shift from a reference point of a specific pixel coordinate (x, y) of a frame that is distorted (which is associated with the image sensor pixel (x, y) capturing the frame pixel). The pixel coordinate of the distorted frame may be referred to as $C_{input}$. The shift associated with the distorted frame pixel coordinate $C_{input}$ may be referred to as $OIS_{shift}(C_{input})$.

The lens position shift may affect lens distortions and rolling shutter distortions. The device 600 may determine a function to reduce lens distortion and rolling shutter distortion. An example reduction function is shown in equation (4) below:

$$C_{corrected}=ROT(CorrectionAngle)*LDC(C_{input}+OIS_{shift}(C_{input})) \quad (4)$$

LDC is a lens distortion correction (LDC) transform for converting a distorted frame to an at least partially undistorted frame. For example, a lens may condense information intended for the edges of a frame toward the center of a frame based on a curvature of the lens. The LDC may be used to stretch the distorted frame based on the lens curvature back to the intended undistorted frame. In some implementations, the LDC may reduce lens distortion but not completely remove lens distortion every frame. "$C_{input}+OIS_{shift}(C_{input})$" indicates a shifted pixel coordinate associated with the input pixel coordinate of the frame/image sensor. In this manner, the LDC transform is applied to the pixel value at the shifted pixel coordinate of the frame.

CorrectionAngle is a difference between angles of the camera 601 during different times of the readout for a rolling shutter. For example, the CorrectionAngle associated with $C_{input}$ is shown in equation (5):

$$CorrectionAngle(C_{input})=Angle(time(C_{input}))-Angle(time(C_{center})) \quad (5)$$

Time($C_{input}$) is the time when the image sensor pixel $C_{input}$ is read out during the rolling shutter. Angle(time ($C_{input}$)) is the angle of the camera 601 at time($C_{input}$). Center is the pixel coordinate of the center of the image sensor. Time($C_{center}$) is the time when the image sensor pixel $C_{input}$ is read out during the rolling shutter. Angle(time ($C_{center}$)) is the angle of the camera 601 at time($C_{center}$). Each angle may include or be represented by one or more Euler angles (which may indicate roll, pitch, or yaw). In this manner, measurements by the gyroscope 620 at time($C_{input}$) or time($C_{center}$) may be converted to the one or more Euler angles. In another example, each angle may be represented by a quaternion. In this manner, measurements by the gyroscope 620 may be converted to the quaternion. Referring to FIG. 6, such conversions may be performed by the sensor controller 622, the processor 604, or another suitable component of the device 600. Referring to FIG. 7, such conversion may be performed by the sensor controller 722 or the NCS module 718. In some implementations, the device 600 is calibrated to synchronize or associate the gyroscope measurements and the pixel read outs for a rolling shutter. Calibration may include determining which gyroscope measurement corresponds to which portion of a specific frame read out for the rolling shutter.

Referring back to equation (4), ROT(CorrectionAngle) is a rotation transform based on the correction angles for the image sensor pixels. For example, the rotation transform may be a matrix that, when multiplied to a specific image sensor pixel coordinate, indicates a pixel coordinate of a rolling shutter undistorted frame. The device 600 determines the rotation matrix based on all pairs of the correction angle and pixel coordinates such that, for each image sensor pixel, the rotation matrix is applied each pixel location of a distorted frame to provide a location (such as a pixel coordinate) in a frame undistorted by rolling shutter. If the camera 601 includes a global shutter, the CorrectionAngle for each pixel is zero since all of the pixels are captured at one time instance (and no rolling shutter distortion exists in the captures). In some implementations, ROT(CorrectionAngle) in equation (4) may be replaced with one when the camera 601 includes a global shutter. In this manner, $C_{corrected}$ is the pixel location in an undistorted frame after the LDC transform.

If the camera 601 includes a rolling shutter, the pixel location provided by the LDC transform and the pixel location provided by the ROT rotation transform are combined to determine a final pixel location $C_{corrected}$. Equation (4) shows a multiplication of the two values to represent a combination, but any suitable operation may be performed to combine the two values. For example, the LDC transform value and the ROT rotation transform value for an input pixel may be averaged. The average may be a simple average or may be skewed (such as towards one value or another or an edge of a frame based on the values).

In some implementations, the device 600 configures the image signal processor 612 to perform EIS by determining the pixel values of a processed frame based on the captured frame and the function to reduce lens distortion and rolling shutter distortion. For example, the image signal processor 612 may use the function shown in equation (4) to map pixel values in a captured frame to pixel locations in a processed frame. Referring to FIG. 7, the EIS filter module 736 may determine the function in equation (4) as the EIS transform 738, and the function is used to configure the image signal processor 714.

While some examples are provided for determining an EIS to be performed in light of a lens shift OIS performed during capture, variations of the examples may be used. Therefore, the disclosure is not limited to the specific examples provided.

Module Tilt OIS

For module tilt OIS, a camera lens position is fixed with reference to the image sensor position, and a module including the lens and image sensor may rotate based on a rotation of the camera. Referring back to FIG. 7, the lens 704 is fixed in position to the position of the image sensor 702. The lens position sensor 706 may indicate a rotation of the lens 704 as the module including the lens 704 and the image sensor 702 tilts. Since the image sensor 702 tilts (as compared to the lens shift OIS system), determining the EIS based on module tilt OIS may include different functions than as shown above for determining an EIS based on lens shift OIS.

Referring back to equation (4), there is no lens position shift ($OIS_{shift}$ equals zero) for module tilt OIS. With $OIS_{shift}$ equal to zero for module tilt OIS, the example reduction function in equation (4) to reduce lens distortion and rolling shutter distortion (by mapping pixels from a distorted frame to pixels of a processed frame) may be simplified to as shown in equation (6) below:

$$C_{corrected}=ROT(CorrectionAngle)*LDC(C_{input}) \quad (6)$$

As noted above, the multiplication symbol may refer to any suitable combination of the location value from the rotation transform and the location value from the LDC transform. In some implementations, since the image sensor rotates during module tilt OIS, determining the CorrectionAngle may differ than if based on lens shift OIS. For example, equation (5) showing an example function for CorrectionAngle may not account for a rotation of the image sensor during read out for a rolling shutter. For module tilt OIS, the CorrectionAngle function may be adjusted to account for OIS based rotation of the image sensor. For example, the CorrectionAngle associated with $C_{input}$ for module tilt OIS is shown in equation (7):

$$CorrectionAngle(C_{input})=Angle(time(C_{input}))+ \\ Angle_{OIS}(time(C_{input}))-Angle(time(C_{center}))- \\ Angle_{OIS}(time(C_{center})) \quad (7)$$

$Angle_{OIS}$ is the angle of the image sensor with reference to the camera 601 at time($C_{input}$) or time($C_{center}$). In equation (7), the difference in $Angle_{OIS}$ for the time of read out of the input pixel and for the time of read out of the center pixel is added to the difference in camera angle for the time of read out of the input pixel and for the time of read out of the center pixel. When the image sensor is in a neutral position (such as the module not being tilted toward any side, away from the center of the camera 601), $Angle_{OIS}$ is zero. If the image sensor is not tilted (or remains at the same tilt) during read out, the difference between the $Angle_{OIS}$ in equation (7) is zero, and equation (7) is the same as equation (5).

In some implementations, the device 600 configures the image signal processor 612 to perform EIS by determining the pixel values of a processed frame based on the captured frame and the function to reduce lens distortion and rolling shutter distortion. For example, the image signal processor 612 may use the function shown in equation (6) (which may be based on equation (7)) to map pixel values in a captured frame to pixel locations in a processed frame. Referring to FIG. 7, the EIS filter module 736 may determine the function in equation (6) based on equation (7) as the EIS transform 738, and the function is used to configure the image signal processor 714.

As noted herein, the device 600 may be calibrated before use. In some implementations, calibration may include correlating time stamps from captured frames (indicating when the frame was captured) to time stamps from lens position sensor measurements (indicating when the lens position sensor 706 (such as a hall sensor) measured the position of lens 704). Calibration may also include determining a model of scene motion in a sequence of captured frames based on the lens position sensor measurements. For correlating time stamps, the device 600 may determine an offset between when the lens position sensor measures and when a frame is captured.

Figure 9:
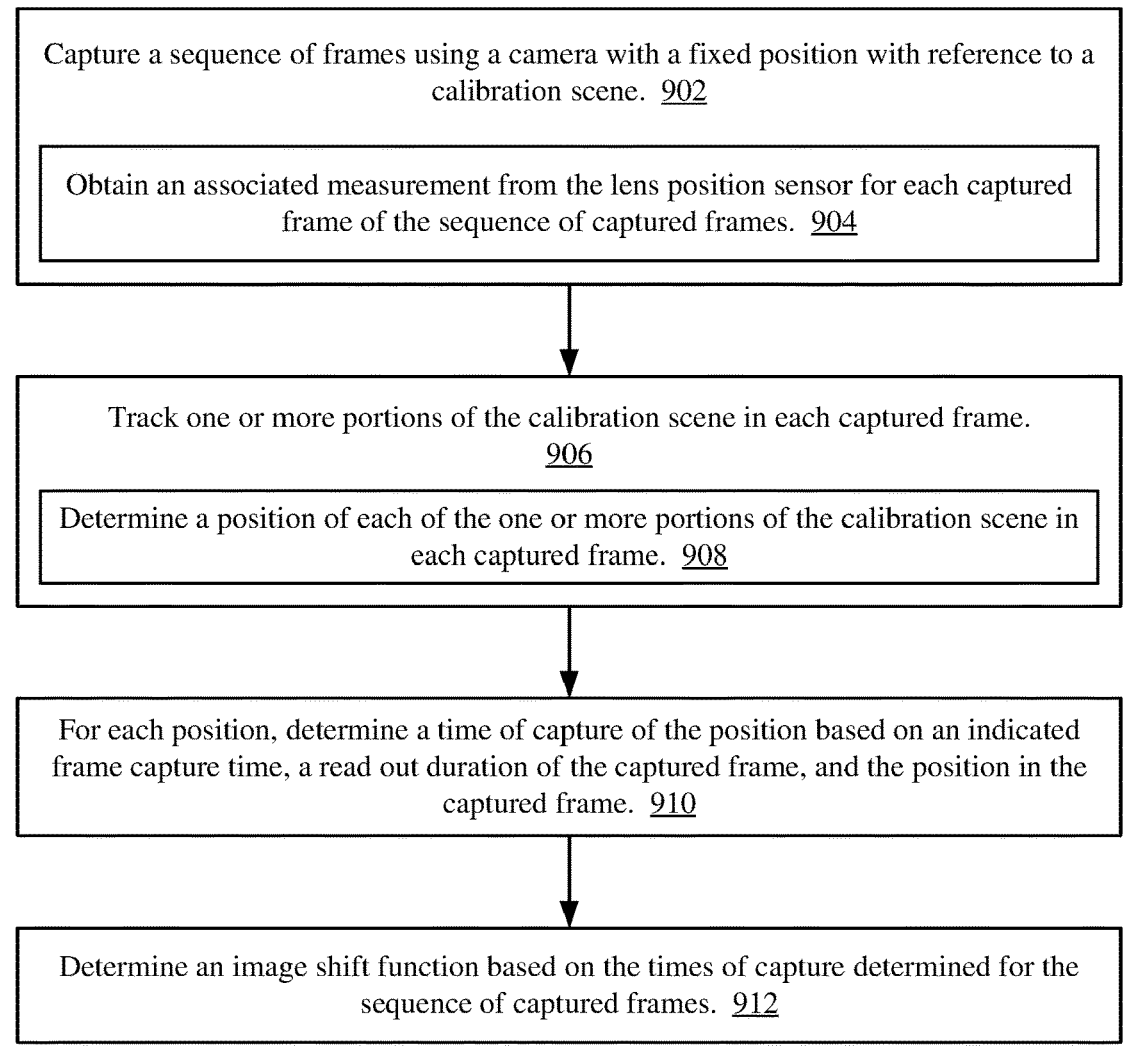
FIG. 9 shows an illustrative flow chart depicting an example operation for calibrating measurements from OIS to be used for EIS.

For determining the model of scene motion, the device 600 may determine an image shift function mapping the scene motion as a function of the lens position sensor measurements. In this manner, the image shift function maps a movement of a scene in a frame across a sequence of frames. FIG. 9 shows an illustrative flow chart depicting an example operation 900 for calibrating measurements from OIS to be used for EIS. The example operation 900 may be used to determine the image shift function. While the examples are described in terms of using a hall sensor, any suitable lens position sensor may be used. Additionally, while the example operation 900 is described in terms of being performed by the device 600 or the system 700, any suitable device, system, or configuration of components may be used to perform the example operation 900.

At 902, the device 600 may capture a sequence of frames of a calibration scene using camera 601 with a fixed position with reference to the calibration scene. In some implementations, the calibration scene is a checkerboard pattern, and the camera 601 is at a fixed rotation and is a fixed location from the checkerboard pattern. In some implementations, the checkerboard pattern is positioned so that the image sensor captures one or more corners of the checkerboard pattern. In addition or to the alternative, the corners of the squares in the checkerboard pattern are used for calibration. Other suitable calibration scenes may exist, including shapes with corners (such as rectangles, triangles, and so on), line segment intersections (such as plusses, Xs, and so on), or other identifiable aspects (for the device 600 to identify a point in the scene) in captured frames. As such, a calibration scene may take many forms.

During capture of the sequence of frames (902), the device 600 may obtain an associated measurement from the lens position sensor for each captured frame (904). For example, the device 600 may obtain measurements from a hall sensor that a captured at approximately the same time the scene is captured (such as during read out of one or more pixels for a rolling shutter).

At 906, the device 600 may track one or more portions of the calibration scene in each captured frame. For example, one or more corners of a checkerboard pattern may be tracked, or one or more square corners in the checkerboard pattern may be tracked. To track the one or more portions of the calibration scene (906), the device 600 may determine a position of each of the one or more portions of the calibration scene in each captured frame (908).

At 910, the device 600 may determine a time of capture for each position based on an indicated frame capture time (such as a time stamp in the frame), a read out duration of the captured frame (based on a rolling shutter), and the position in the captured frame. For a position captured in the frame, and assuming the rolling shutter captures are per row, an example function for determining the time the position is captured (time(position)) is shown in equation (8) below:

$$\text{Time(position)} = \text{time}_{SOF} + \text{duration}_{read\ out} * \frac{x_{position}}{X} \quad (8)$$

$\text{Time}_{SOF}$ is the time when read out occurs of the start of frame. $\text{Duration}_{readout}$ is the time duration for reading out all of the pixels of the image sensor for a rolling shutter. In some implementations, a row may be read out at one time instance for a rolling shutter. In this manner, the $\text{duration}_{readout}$ may be multiplied by the fraction of the vertical location of the position in the frame ($x_{position}$) divided by the total number of rows $X$ in the frame.

At 912, the device 600 determines an image shift function based on the determined times of capture. To note, since the position of the calibration scene is fixed with reference to the position of the camera 601, the gyroscope measurements based on camera movement may be ignored. In this manner, any movement of the calibration scene in frames captured during calibration may be associated only with movements caused by OIS (such as shifting the lens 602 or rotating the lens 602 and the image sensor). In this manner, any movement of the tracked portions of the calibration scene across the sequence of frames may be associated with the OIS performed.

A position may shift in a frame across the sequence of frames. As a result, the offset from the start of frame read out may differ between frames for the position. For example, the fraction of $x_{position}$ divided by the total number of rows $X$ may change during the capture of the sequence of frames. In some implementations, of determining a shift function, the device 600 may normalize the times for read out of the position across the frames. For example, the time of read out of the position for each frame may be set as the time to be associated with a lens displacement sensor measurement times (such as a time stamp for a hall sensor measurement). The device 600 may associate a closest time stamp from the hall sensor measurements to the time of read out. In this manner, the device 600 may correlate a hall sensor measurement to each of the times of the position captures for the frames.

The image shift function may include a curve fitted to the data of lens position sensor measurements correlated to the times of the positions captures. For example, if four corners of the calibration scene are tracked, four sets of data are determined correlating lens position sensor measurements to the time of capture of one of the corners across the sequence of frames. A curve fitting is performed to best fit the four sets of data across time. In some implementations, the curve may be defined by a third degree polynomial (though any suitable degree may be used).

As noted herein, the lens position sensor may indicate a position of the lens in a two dimensional space (such as in a plane for a lens shift OIS or on a curved surface for a module tilt OIS). The two dimensional space may be mapped in terms of a U axis and a V axis. In some implementations of calibration, the image shift function maps a lens movement along a vertical axis of the image sensor (X) and a horizontal axis of the image sensor (Y). The U axis may align with the X axis of the image sensor, and the V axis may align with the Y axis of the image sensor.

For curve fitting across the X axis and the Y axis, a first curve for motion on the X axis and a second curve for motion of the Y axis are both fit during curve fitting (such as via regression). If a third order polynomial curve is used for each axis, a combined polynomial curve for both the X axis and the Y axis may be the product of the two third order polynomial curves. An example function of the combined third order polynomial curves is shown in equation (9) below:

$$\text{SHIFT} = \sum_{i=0,j=0}^{3,3} p_{ij} * \text{Hall}(u)^i * \text{Hall}(v)^j \quad (9)$$

SHIFT is a candidate function to map an input pixel position to a shifted pixel position in a frame as a result of OIS during capture. For example, SHIFT may be a candidate combined $\text{OIS}_{shift}$ described herein. An inverse of the SHIFT function may be performed on a captured frame to validate the quality of the SHIFT function. The device 600 (or another) may then determine, based on the quality, whether the SHIFT function is to be the $\text{OIS}_{shift}$ used for determining an EIS. For example, the frame after performing the inverse of the SHIFT function may be analyzed to determine any remaining warping or shifting (with a quality indicating a reduction in warping or shifting or a remaining amount of warping or shifting in the frame).

Variable i is the order of the term for the X axis third order polynomial curve. Variable j is the order of the term for the Y axis third order polynomial curve. If a different order is to be used, the summation may be up to different maximums for variables i and j. Parameter $p_{ij}$ is the parameter for the term for each combination of variable i and j. For example, pit is the parameter for term 'Hall(u)*Hall(v)$^2$.' Hall(u) is the hall sensor measurement along axis U, and Hall(v) is the hall sensor measurement along axis V. If axis U corresponds to axis X and axis V corresponds to axis Y. In some implementations, the parameters $p_{ij}$ may be associated with parameters 'a'-'d' for two $\text{OIS}_{shift}$ functions. In comparing equation (1) and equation (9), if the lens position sensor is a hall sensor, then Hall(x) or Hall(y) may be the same as OISLensPos for the X axis or Y axis, respectively.

Alternative to performing curve fitting using a combined curve SHIFT of two polynomial curves, curve fitting may involve curve fitting using two separate polynomial curves with reference to one another. For example, an optimization of both curves may be performed at the same time to determine the two separate OIS shift functions.

In some implementations of curve fitting, the one or more parameters may be adjusted, and the resulting one or more image shift functions may be analyzed to determine the quality of the function(s) (such as by analyzing remaining warping or shifting after performing an inverse of the one or more curves on a captured frame). After the final image shift function(s) are determined, the device 600 may store the image shift function(s) or the parameters of the image shift function(s) (such as in memory 606 or another suitable location) to be used to determine an EIS to be performed based on OIS during frame capture.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium (such as the memory 606 in the example device 600 of FIG. 6) comprising instructions 608 that, when executed by the processor 604 (or the camera controller 610 or the image signal processor 612 or the sensor controller 622), cause the device 600 to perform one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as the processor 104 or the image signal processor 612 in the example device 600 of FIG. 6. Such processor(s) may include but are not limited to one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

While the present disclosure shows illustrative aspects, it should be noted that various changes and modifications could be made herein without departing from the scope of the appended claims. Additionally, the functions, steps or actions of the method claims in accordance with aspects described herein need not be performed in any particular order unless expressly stated otherwise. For example, the steps of the described example operations, transforms, and models, if performed by the device 600, the camera controller 610, the processor 604, the image signal processor 612, and/or the sensor controller 622, may be performed in any order and at any frequency. Furthermore, although elements may be described or claimed in the singular, the plural is contemplated unless limitation to the singular is explicitly stated. Accordingly, the disclosure is not limited to the illustrated examples and any means for performing the functionality described herein are included in aspects of the disclosure.

What is claimed is:

1. A device configured to perform electronic image stabilization, comprising:
    a memory; and
    one or more processors configured to:
        obtain optical image stabilization (OIS) information for OIS performed during capture of a sequence of frames by an image sensor of a camera, wherein the OIS information includes indications of positions of a movable camera lens associated with the image sensor during capture of the sequence of frames;

obtain camera position information for the camera;
obtain frame capture information for the sequence of frames;
obtain, from the frame capture information, image rendering data for each frame of the sequence of frames, the image rendering data including information for rendering the frame as an image;
based on the image rendering data, compare the positions of the movable camera lens with the camera position information and, based on the comparison, determine a camera movement;
determine that the camera movement is greater than a threshold; and
in response to the determination that the camera movement is greater than the threshold, determine an electronic image stabilization (EIS) filter based on the comparison of the positions of the movable camera lens with the camera position information, the sequence of frames, and the image rendering data.

2. The device of claim 1, wherein the EIS filter includes a shift function indicating, for each of a plurality of pixel locations in the sequence of frames before processing, a shift of the pixel location in an unprocessed frame to an associated pixel location in a processed frame.

3. The device of claim 1, wherein:
the position of the movable camera lens is with reference to the image sensor; and
the one or more processors are further configured to:
determine a lens distortion correction (LDC) transform based on the positions of the moveable camera lens during capture of the sequence of frames, wherein the EIS filter is based on the LDC transform.

4. The device of claim 1, wherein the one or more processors are further configured to:
determine a rotation transform for reducing rolling shutter distortion, wherein:
the rotation transform is based on a difference between an angle of the image sensor at read out of each image sensor pixel and an angle of the image sensor at read out of the center image sensor pixel; and
the EIS filter is based on the rotation transform.

5. The device of claim 1, further comprising a camera including:
the image sensor configured to capture the sequence of frames;
the movable camera lens associated with OIS during capture of the sequence of frames; and
a lens position sensor associated with the movable camera lens.

6. The device of claim 5, wherein:
the OIS is a lens shift OIS; and
the movable camera lens is configured to move with reference to the image sensor.

7. The device of claim 5, wherein:
the OIS is a module tilt OIS;
a position of the movable camera lens is fixed with reference to a position of the image sensor; and
the movable camera lens is configured to rotate along with the image sensor.

8. The device of claim 5, further comprising a gyroscope configured to measure a position of the camera, wherein the camera position information is based on measurements by the gyroscope.

9. The device of claim 1, further comprising an image signal processor, wherein the one or more processors are further configured to configure the image signal processor to perform EIS on the sequence of frames based on the EIS filter.

10. The device of claim 9, further comprising a video encoder configured to encode the processed sequence of frames after EIS to generate a video.

11. The device of claim 1, wherein the one or more processors are further configured to:
determine a profile of distortion based on a type of the OIS performed; and
determine the EIS filter based on an inverse of the determined profile.

12. A method for performing electronic image stabilization (EIS), comprising:
obtaining optical image stabilization (OIS) information for OIS performed during capture of a sequence of frames by an image sensor of a camera, wherein the OIS information includes indications of positions of a movable camera lens associated with the image sensor during capture of the sequence of frames;
obtaining camera position information for the camera;
obtaining frame capture information for the sequence of frames;
obtaining, from the frame capture information, image rendering data for each frame of the sequence of frames, the image rendering data including information for rendering the frame as an image;
based on the image rendering data, comparing the positions of the movable camera lens with the camera position information and, based on the comparison, determine a camera movement;
determining that the camera movement is greater than a threshold; and
in response to determining that the camera movement is greater than the threshold, determining an electronic image stabilization (EIS) filter based on the comparison of the positions of the movable camera lens with the camera position information, the sequence of frames, and the image rendering data.

13. The method of claim 12, wherein the EIS filter includes a shift function indicating, for each of a plurality of pixel locations in the sequence of frames before processing, a shift of the pixel location in an unprocessed frame to an associated pixel location in a processed frame.

14. The method of claim 13, further comprising determining a lens distortion correction (LDC) transform based on positions of the moveable camera lens with reference to the image sensor during capture of the sequence of frames, wherein the EIS filter is based on the LDC transform.

15. The method of claim 13, further comprising determining a rotation transform for reducing rolling shutter distortion, wherein:
the rotation transform is based on a difference between an angle of the image sensor at read out of each image sensor pixel and an angle of the image sensor at read out of the center image sensor pixel; and
the EIS filter is based on the rotation transform.

16. The method of claim 13, further comprising:
capturing the sequence of frames by the image sensor; and
moving the movable camera lens for OIS during capture of the sequence of frames.

17. The method of claim 16, wherein:
the OIS is a lens shift OIS; and
moving the movable camera lens includes moving the movable camera lens with reference to the image sensor.

18. The method of claim 16, wherein:
the OIS is a module tilt OIS;
a position of the movable camera lens is fixed with reference to a position of the image sensor; and
moving the movable camera lens includes rotating the movable camera lens along with the image sensor.

19. The method of claim 12, further comprising configuring an image signal processor to perform EIS on the sequence of frames based on the EIS filter.

20. The method of claim 12, further comprising:
determining a profile of distortion based on a type of the OIS performed; and
determining the EIS filter based on an inverse of the determined profile.

21. A non-transitory computer-readable medium storing instructions that, when executed by one or more processors of a device to perform electronic image stabilization, cause the device to:
obtain optical image stabilization (OIS) information for OIS performed during capture of a sequence of frames by an image sensor of a camera, wherein the OIS information includes indications of positions of a movable camera lens associated with the image sensor during capture of the sequence of frames;
obtain camera position information for the camera;
obtain frame capture information for the sequence of frames;
obtain, from the frame capture information, image rendering data for each frame of the sequence of frames, the image rendering data including information for rendering the frame as an image;
based on the image rendering data, compare the positions of the movable camera lens with the camera position information and, based on the comparison, determine a camera movement;
determine that the camera movement is greater than a threshold; and
in response to the determination that the camera movement is greater than the threshold, determine an electronic image stabilization (EIS) filter based on the comparison of the positions of the movable camera lens with the camera position information, the sequence of frames, and the image rendering data.

22. The computer-readable medium of claim 21, wherein the EIS filter includes a shift function indicating, for each of a plurality of pixel locations in the sequence of frames before processing, a shift of the pixel location in an unprocessed frame to an associated pixel location in a processed frame.

23. The computer-readable medium of claim 21, wherein execution of the instructions further causes the device to determine a lens distortion correction (LDC) transform based on positions of the moveable camera lens with reference to the image sensor during capture of the sequence of frames, wherein the EIS filter is based on the LDC transform.

24. The computer-readable medium of claim 21, wherein execution of the instructions further causes the device to determine a rotation transform for reducing rolling shutter distortion, wherein:
the rotation transform is based on a difference between an angle of the image sensor at read out of each image sensor pixel and an angle of the image sensor at read out of the center image sensor pixel; and
the EIS filter is based on the rotation transform.

25. The computer-readable medium of claim 21, wherein execution of the instructions further causes the device to:
capture the sequence of frames by the image sensor; and
move the movable camera lens with reference to the image sensor for OIS during capture of the sequence of frames, wherein the OIS is a lens shift OIS.

26. The computer-readable medium of claim 21, wherein execution of the instructions further causes the device to:
capture the sequence of frames by the image sensor; and
rotate the movable camera lens along with the image sensor for OIS during capture of the sequence of frames, wherein:
the OIS is a module tilt OIS; and
a position of the movable camera lens is fixed with reference to a position of the image sensor.

27. The computer-readable medium of claim 21, wherein execution of the instructions further causes the device to:
determine a profile of distortion based on a type of the OIS performed; and
determine the EIS filter based on an inverse of the determined profile.

* * * * *